United States Patent
Ledlie et al.

(10) Patent No.: US 8,581,698 B2
(45) Date of Patent: Nov. 12, 2013

(54) METHOD, APPARATUS AND COMPUTER PROGRAM PRODUCT FOR FACILITATING LOCATION DISCOVERY

(75) Inventors: Jonathan Ledlie, Cambridge, MA (US); Jamey Hicks, Newton, MA (US); Seth J. Teller, Cambridge, MA (US); Dorothy W. Curtis, Framingham, MA (US); Jonathan Battat, Los Angeles, CA (US); Benjamin Charrow, Chicago, IL (US)

(73) Assignees: Nokia Corporation, Espoo (FI); Massachusetts Institute of Technology, Cambridge, MA (US)

( * ) Notice: Subject to any disclaimer, the term of this patent is extended or adjusted under 35 U.S.C. 154(b) by 951 days.

(21) Appl. No.: 12/277,747

(22) Filed: Nov. 25, 2008

(65) Prior Publication Data

US 2010/0127887 A1    May 27, 2010

(51) Int. Cl.

| | |
|---|---|
| G08B 5/22 | (2006.01) |
| G08B 1/08 | (2006.01) |
| G08B 5/36 | (2006.01) |
| B60Q 1/00 | (2006.01) |
| B60Q 1/52 | (2006.01) |
| H04W 4/00 | (2009.01) |
| H04W 24/00 | (2009.01) |
| H04L 12/28 | (2006.01) |
| G06F 12/00 | (2006.01) |
| H04M 11/04 | (2006.01) |
| H04B 7/00 | (2006.01) |

(52) U.S. Cl.
USPC .................. 340/8.1; 340/539.13; 340/815.49; 340/425.5; 340/471; 370/338; 370/328; 370/401; 726/17; 455/404.2; 455/456.1; 455/41.2

(58) Field of Classification Search
USPC .............. 340/10.2, 10.3, 10.32, 572.1, 572.2, 340/572.4, 10.41, 10.42, 10.51, 10.52, 340/539.13, 10.1, 825.49, 870.11, 825.73, 340/7.21, 572, 505, 825.54, 825.34, 825.31, 340/825.69, 825.72, 572.7; 455/456, 440, 455/441, 457, 435, 432, 433, 414, 560, 418, 455/461, 417, 517; 370/314, 442, 310, 370/310.2, 317–319, 324, 328, 351–356, 370/389, 395.52, 428, 521; 380/270; 725/81, 80, 62
See application file for complete search history.

(56) References Cited

U.S. PATENT DOCUMENTS

2004/0190718 A1* 9/2004 Dacosta ........................ 380/247
2006/0176849 A1* 8/2006 Gass ............................. 370/328

(Continued)

OTHER PUBLICATIONS

P. Bahl, V. N. Padmanabhan and A. Balachandran. Enhancements to the radar user location and tracking System. Technical Report MSR-TR-00-12, Microsoft Research, Feb. 2000.

(Continued)

Primary Examiner — Jennifer Mehmood
Assistant Examiner — Mirza Alam
(74) Attorney, Agent, or Firm — Ditthavong Mori & Steiner, P.C.

(57) ABSTRACT

A method, apparatus and computer program product are provided to permit location discovery, including location discovery in indoor settings. The method may identify a wireless signature present at a geographical location and determine whether the wireless signature corresponds to a previously observed wireless signature associated with the predefined geographical location. In instances in which the wireless signature fails to correspond to a previously observed wireless signature, the method may also receive an identification of a geographical location and associate, such as by means of a processor, the wireless signature with the identification of the geographical location. A corresponding computer program product and apparatus are also provided.

20 Claims, 7 Drawing Sheets

(56) References Cited

U.S. PATENT DOCUMENTS

| | | | |
|---|---|---|---|
| 2007/0104157 A1* | 5/2007 | Kawaguchi et al. | 370/338 |
| 2008/0209543 A1* | 8/2008 | Aaron | 726/17 |
| 2009/0129327 A1* | 5/2009 | Horn et al. | 370/329 |
| 2009/0254975 A1* | 10/2009 | Turnbull et al. | 726/3 |
| 2009/0322517 A1* | 12/2009 | Kalasapur et al. | 340/539.13 |

OTHER PUBLICATIONS

P. Bahl and V. N. Padmanabhan. Radar: An In-Building RF-based User Location and Tracking System. In *INFOCOM*, Tel Aviv, Israel, Mar. 2000.

B. Brumitt, B. Meyers, J. Krumm, A. Kern, and S. A. Shafer. Easlyliving: Technologies for Intelligent Environments. In *Proc. of Handheld and Ubiquitous Computing*, Bristol, UK, Sep. 2000.

V. Bychokovsky, B. Hull, A. Miu, H. Balakrishnan, and S. Madden. A Measurement Study of Vehicular Internet Access Using In-Situ 801.11 Networks. In *Proc. of the Conference on Mobile Computing and Networking (Mobicom)*, Los Angeles, CA, Sep. 2006.

P. Castro, P. Chiu, T. Kremenek, and R.R. Muntz. A Probabilistic Room Location Service for Wireless Networked Environments. In *Ubiquitous Computing*, Atlanta, GA, Sep. 2001.

J. R. Douceur. The Sybil Attack, International Workshop on Peer-to-Peer Systems (IPTPS), Cambridge, MA, Mar. 2002.

N. Eagle and A. Pentland. Social Serendipity: Mobilizing Social Software. *IEEE Pervasive Computing*, 2(4):28-34, 2006.

Ekahau Positioning Engine. <http://www.ekahau.com>.

R. J. Fontana, E. Richley and J. Barney. Commercialization of an Ultra Wideband Precision Asset Location System. In *Ultra Wideband Systems and Technologies*, Germantown, MD, Nov. 2007.

A. Guttman. R-Trees A Dynamic Index Structure for Spatial Searching. SIGMOD Rec., 14(2):45-57, 1984.

A. Haeberlen, E. Flannery, A. M. Ladd, A. Rudys, D. S. Wallach and L. E. Kavraki. Practical Robust Location Over Large-Scale 802.11 Wireless Networks. In *MOBICOM*, Philadelphia, PA, Sep. 2004.

A. Harter, A. Hopper, P. Steggles, A. Ward and P. Webster. The Anatomy of a Context-Aware Application. In *Proc. of the Fifth Annual ACM/IEEE International Conference on Mobile Computing and Networking (MOBICOM)*, Seattle, WA, 1999.

J. Hightower, S. Consolvo, A. LaMarca, I. Smith and J. Hughes. Learning and Recognizing the Places We Go. Technical Report University of Washington Computer Science & Engineering, *Intel Reasearch Seattle*, Seattle, WA.

J. Hightower, R. Want and G. Borriello. Spoton: An Indoor 3D Location Sensing Technology Based on RF Signal Strength. Technical Report UW CSE Feb. 2, 2000, University of Washington, Seattle, WA, Feb. 2000.

Anthony LaMarca, Yatin Chawathe, Sunny Consolvo, Jeffrey Hightower, Ian Smith, James Scott, Tim Sohn, James Howard, Jeff Hughes, Fred Potter, Jason Tabert, Pauline Powledge, Gaetano Borriello, Bill Schilit: Place Lab: Device Positioning Using Radio Beacons in the Wild, Pervasive Computing, Munich, Germany, May 2005.

C. Jemigan, C. Bayley, J. Lin and C. Wright. Locale. <http://people.csail.mit.edu/hal/mobile-apps-spring-08/>, Dec. 16, 2008.

A. Krause, E. Horvitz, A. Kansal and F. Zhao. Toward Community Sensing. In *IPSN*, St. Louis, Missouri, Apr. 2008.

J. Krumm and J. Platt. Minimizing Calibration Effort for an Indoor 802.11 Device Location Measurement System Technical Report MSR-TR-03-82, Microsoft Research, Nov. 2003.

K. Lorincz and M. Welsh. Motetrack: A Robuts, Decentralized Approach to RF-Based Location Tracking. In *Proc. of Location- and Context-Awareness (LoCA)*, Oberpfaffenhofen, Germany, May 2005.

Navizon: Peer-to-Peer Wireless Positioning. <http://www.navizon.com/>, Dec. 31, 2008.

D. Niculescu and B. R. Badrinath. Ad Hoc Positioning System (APS) Using AOA. In *INFOCOM*, San Francisco, CA, Mar. 2003.

N. Priyantha, A. Chakraborty and H. Balakrishnan. The Cricket Location-Support System. In *MOBICOM*, pp. 31-43, Boston, MA, Aug. 2000.

T. Roos, P. Myllymäki, H. Tirri, P. Misikangas and M. Sievänen. A Probabilistic Approach to WLAN User Location Estimation. *International Journal of Wireless Information Networks (IJWIN)*, 9(3), 2002.

A. Savvides, C.-C. Han and M. B. Srivastava. Dynamic Fine-Grained Localization in Ad-Hoc Networks of Sensors. In *MOBICOM*, Rome, Italy, Jul. 2001.

Y. Shang, W. Ruml, Y. Zhang and M. P. J. Fromherz. Localization from Mere Connectivity. In *Symposium on Mobile Ad Hoc Networking and Computing (MobiHoc)*, Annapolis, Maryland, 2003.

Skyhook Wireless. <http://www.skyhookwireless.com/>, Dec. 31, 2008.

Sonitor Indoor Positioning. <http://www.sonitor.com/>, Dec. 31, 2008.

Talking Lights. <http://talking-lights.com/>.

R. Want, V. Falcao and J. Gibbons. The Active Badge Location System. *ACM Transactions on Information Systems*, 10:91-102, 1992.

L. Whitcomb, D. Yoerger, H. Singh and J. Howland. Advances in Underwater Robot Vehicles for Deep Ocean Exploration: Navigation, Control, and Survey Operations. In *The Ninth International Symposium on Robotics Research*, Springer-Verlag, London, 2000.

E. Whiting, J. Battat and S. Teller. Generating a Topological Model of Multi-Building Environments from Floorplans. In *Proc. of Computer-Aided Architectural Design Futures (CAAD)*, pp. 115-128, Jul. 2007.

S. Whittaker, L. Terveen, W. Hill, L. Cherny. The Dynamics of Mass Interaction.

WiGLE: Wireless Geographic Logging Engine. <http://www.wigle.net/>.

Y. Zhang, K. Partridge and J. Reich. Localizing Tags Using Mobile Infrastructure. In *Proc. of Location- and Context-Awareness (LoCA)*, Oberpfaffenhofen, Germany, Sep. 2007.

\* cited by examiner

METHOD, APPARATUS AND COMPUTER PROGRAM PRODUCT FOR FACILITATING LOCATION DISCOVERY

TECHNOLOGICAL FIELD

Embodiments of the present invention relate generally to computing technology and, more particularly, relate to methods, apparatus and computer program products for location discovery.

BACKGROUND OF THE INVENTION

Many types of computing and/or communications devices are capable of providing a wide array of functions while the devices move from place to place. These devices will be generically referenced herein as "mobile devices". For a variety of reasons, it may be advantageous for a mobile device to be able to determine its current location. For example, some mobile devices execute applications, such as calendars, reminders, navigation assistants and communication tools, having functionality that may be altered or enhanced depending upon the location of the mobile device.

In instances in which the mobile device is outdoors, the mobile device may interact with the global positioning system (GPS) infrastructure to identify its location. The GPS infrastructure includes a constellation of satellites and ground tracking stations and depends upon published updates of satellite ephemerides. In order to determine its position, a mobile device may include a GPS receiver having a radio for receiving GPS satellite transmissions as well as sufficient computation and storage resources to estimate its geo-referenced latitude, longitude and elevation (LLE). The LLE of a mobile device may be more easily viewed in the context of a map.

However, GPS is generally only effective outdoors such that a mobile device cannot rely upon the GPS infrastructure to determine its location in an indoor setting. As such, various techniques have been developed to permit mobile devices to determine their location indoors. These techniques provide different design tradeoffs regarding the installation and maintenance burden, accuracy, precision, latency, user privacy and device requirements.

For example, some location information can be obtained through dead-reckoning using odometry, pedometry and/or inertial sensing. However, dead-reckoning generally requires initialization from an external data source and calibrated, dedicated hardware. Moreover, techniques reliant upon dead-reckoning can incur position errors that grow without bound and may therefore be unsuitable for applications that require location data over arbitrarily long time scales.

Another technique that may permit location determination in an indoor setting utilizes a dedicated infrastructure, such as passive or active fiducial markers or beacons, along with corresponding hardware onboard the mobile device to support location discovery. These systems can rely on active clients whose motion is tracked and relayed by the infrastructure to other clients, or active infrastructure, from which each client can compute its own location. The dedicated infrastructure may include ultrasound devices, modulated light fixtures, cameras and/or RF sources that are dedicated to location determination applications. As a result of the dedication of this infrastructure to location determination, the infrastructure may impose a deployment burden that may be unacceptable or impractical in some settings.

In order to avoid the issues associated with a dedicated infrastructure, another technique for determining the location of a mobile device in an indoor setting relies upon the radio frequency (RF) signature that is generated by existing RF signal sources that have been deployed for other purposes and is detected by the mobile device at its current location. The RF signals that constitute the RF signatures may be provided by a variety of existing RF signal sources, such as the access points for wireless local area networks (WLANs), cellular networks, Bluetooth or other proximity-based networks or the like. RF signatures generally include the identity of each RF source and the signal strength of the ambient RF signals from each RF source.

However, prior to use of an RF signature-based technique, a survey of the indoor space must be conducted. This initial site survey generally requires skilled technicians to move throughout the space and to identify the RF signatures at each of a plurality of locations within the space and to associate a particular location with each RF signature. Based upon the database of RF signatures and associated locations created by the site survey, mobile devices may thereafter identify their location by determining the RF signature that exists at its current location and then comparing the current RF signature to the database of previously observed RF signatures created by the initial site survey. The mobile device can then identify the previously observed RF signature that most closely matches the current RF signature with the current location of the mobile device then being defined as the location associated with the most closely matching previously observed RF signature.

Unfortunately, the initial site survey that is required prior to use of this technique is a time intensive process that requires the services of one or more skilled technicians. Not only may the initial site survey be labor intensive and, consequently, relatively expensive, but the initial site survey depends upon the skilled technicians being able to access all of the spaces of interest within a building. Because of privacy and/or security issues, it may not always be desirable for a technician to access each of these spaces. Additionally, changes may occur that may render the initial site survey at least partially inaccurate and may necessitate another site survey, at least of a portion of a building, prior to continued reliance upon this location discovery technique. For example, the RF signal sources may change, such as through the addition of another RF signal source or the removal or movement of an existing RF signal source, or the building may be reconfigured, such as by the addition or removal of a wall.

As such, it may be desirable to provide an improved technique for permitting location discovery, such as location discovery by a mobile device in an indoor environment.

BRIEF SUMMARY OF SOME EXAMPLES OF THE INVENTION

A method, apparatus and computer program product are therefore provided for enhancing location determination, such as in an indoor setting. In this regard, embodiments of the invention provide methods, apparatus and computer program products for merging the survey and use phases of location determination within a space, thereby permitting more rapid use of the location determination system without the investment otherwise required for an initial site survey.

In one embodiment, a method is provided, which may identify a wireless signature present at a geographical location and determine whether the wireless signature corresponds to a previously observed wireless signature associated with the predefined geographical location. In instances in which the wireless signature fails to correspond to a previously observed wireless signature, the method may also receive an identification of a geographical location and associate, such as by means of a processor, the wireless signature with the identification of the geographical location.

In another embodiment, an apparatus is provided having a processor configured to identify a wireless signature present at a geographical location and determine whether the wireless signature corresponds to a previously observed wireless signature associated with a predefined geographical location. In instances in which the wireless signature fails to correspond to a previously observed wireless signature, the processor may receive an indication of the geographical location and associate the wireless signature with the identification of the geographical location. In another embodiment, an apparatus is provided that includes means for identifying a wireless signature present at a geographical location, means for determining whether the wireless signature corresponds to a previously observed wireless signature associated with a predefined geographical location, means for receiving an identification of the geographical location in instances in which the wireless signature fails to correspond to a previously observed wireless signature, and means for associating the wireless signature with the identification of the geographical location.

In a further embodiment, a computer program product is provided that includes at least one computer-readable storage medium having computer-executable program instructions stored therein. The computer-executable program instructions may include a program instruction configured to identify a wireless signature present at a geographical location, a program instruction configured to determine whether the wireless signature corresponds to a previously observed wireless signature associated with a predefined geographical location, a program instruction configured to receive an identification of the geographical location in instances in which the wireless signature fails to correspond to a previously observed wireless signature, and a program instruction configured to associate the wireless signature with the identification of the geographical location.

The receipt of the identification of the geographical location may be in response to a request. In one embodiment, the identification of the geographical location is requested when the wireless signature fails to correspond to any previously observed wireless signature associated with a predefined geographical location. In another embodiment, the identification of the geographical location is requested at predefined time intervals. In either embodiment, the receipt of the identification of the geographical location may be responsive to the respective request. In addition to receiving the identification of the current geographical location, a definition may also be received of a time interval during which the identification of the current geographical location is valid.

In one embodiment, a local memory, such as a memory associated with a mobile device, is updated when the wireless signature identifies a wireless signal source that is different from the wireless signal sources identified by the previously observed wireless signatures stored by the local memory. In another embodiment, the local memory is updated with one or more previously observed wireless signatures associated with respective predefined geographical locations within a predetermined distance of an estimated location, such as the estimated location of a mobile device.

Once the wireless signature has been associated with the identification of the geographical location, this association may be provided to a database, thereby facilitating usage by other mobile devices. In addition, any predefined geographical location associated with a previously observed wireless signature that corresponds to the wireless signature may be provided to permit the accuracy of the location discovery technique to be determined and to facilitate trouble-shooting.

In order to determine whether the wireless signature corresponds to a previously observed wireless signature, it may be determined whether the wireless signature matches a previously observed wireless signature associated with a predefined geographical location. In one embodiment, each previously observed wireless signature has a respective expiration date. In this embodiment, the determination as to whether the wireless signature corresponds to a previously observed wireless signature may include a determination as to whether the wireless signature matches a previously observed wireless signature and remains valid relative to the respective expiration date. In a further embodiment, the determination as to whether the wireless signature matches a previously observed wireless signature includes a determination as to whether a confidence level associated with a potential match satisfies a predefined threshold.

The above summary is provided mainly for purposes of summarizing some example embodiments of the invention so as to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments, some of which will be further described below, in addition to those herein summarized.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

DETAILED DESCRIPTION

Figure 1:
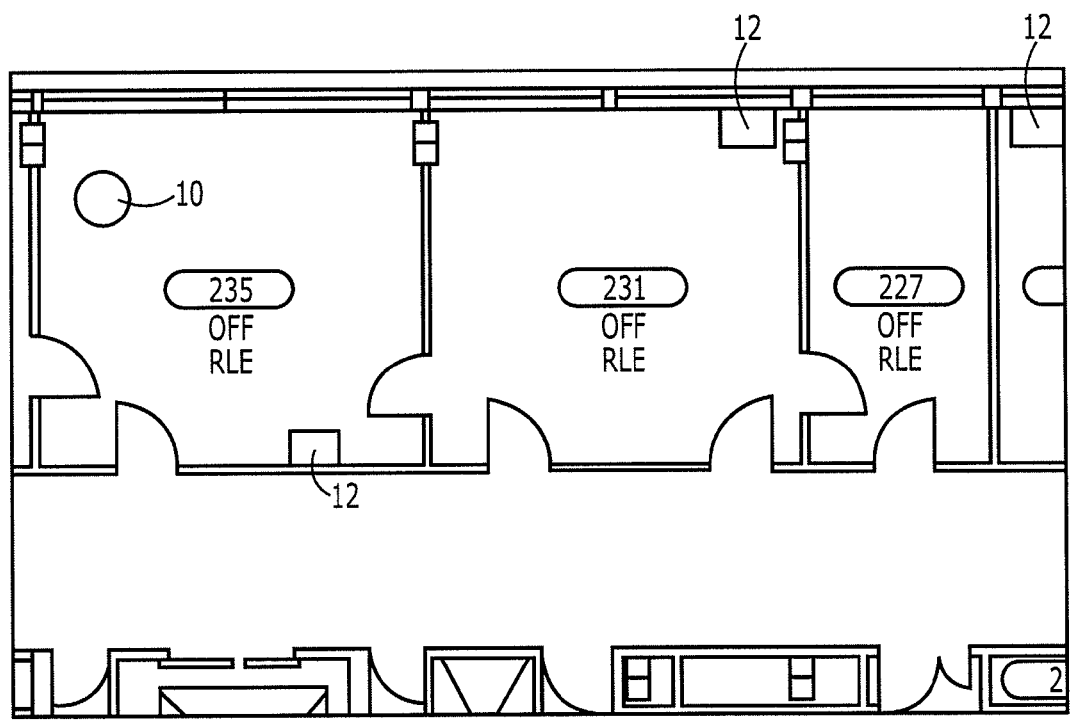
FIG. 1 is a schematic floor plan of a portion of a building illustrating a mobile device and a plurality of signal sources.

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention. Moreover, the term "exemplary", as used herein, is not provided to convey any qualitative assessment, but instead merely to convey an illustration of an example. Thus, use of any such terms should not be taken to limit the spirit and scope of embodiments of the present invention.

FIG. 1 depicts the floor plan of a portion of building. As shown, the building is divided into a number of spaces by walls, doors, windows and the like. In accordance with embodiments of the present invention, a mobile device 10 within the building may advantageously determine its location, such as in terms of the room in which the mobile device is currently located. As explained below, the mobile device may identify a wireless signature present at its current geographical location and, based upon this wireless signature and its association with a predefined geographical location, may determine its current location to be the predefined geographical location with which the wireless signature has been previously associated. By way of example, FIG. 1 depicts three wireless signal sources 12, such as access points for a wireless local area network or the like, that emit wireless signals that combine to define the wireless signature detected by the mobile device in room 235.

In addition to determining whether the wireless signature detected by the mobile device 10 has previously been associated with a predefined geographical location, embodiments of the present invention may also permit the identification of the current location, such as via user input to the mobile device, and the subsequent association of the wireless signature detected by the mobile device with the identified location, thereby permitting population of a database from which subsequent comparisons will be made. By providing both for the automatic determination of the current location based on previously observed wireless signatures and for user identification of the current location, the method, apparatus and computer program product of embodiments of the present invention may advantageously meld both the survey and use aspects of the location discovery technique so as to concurrently support both use of the location discovery technique and further population of a database from which subsequent comparisons will be made.

Figure 2:
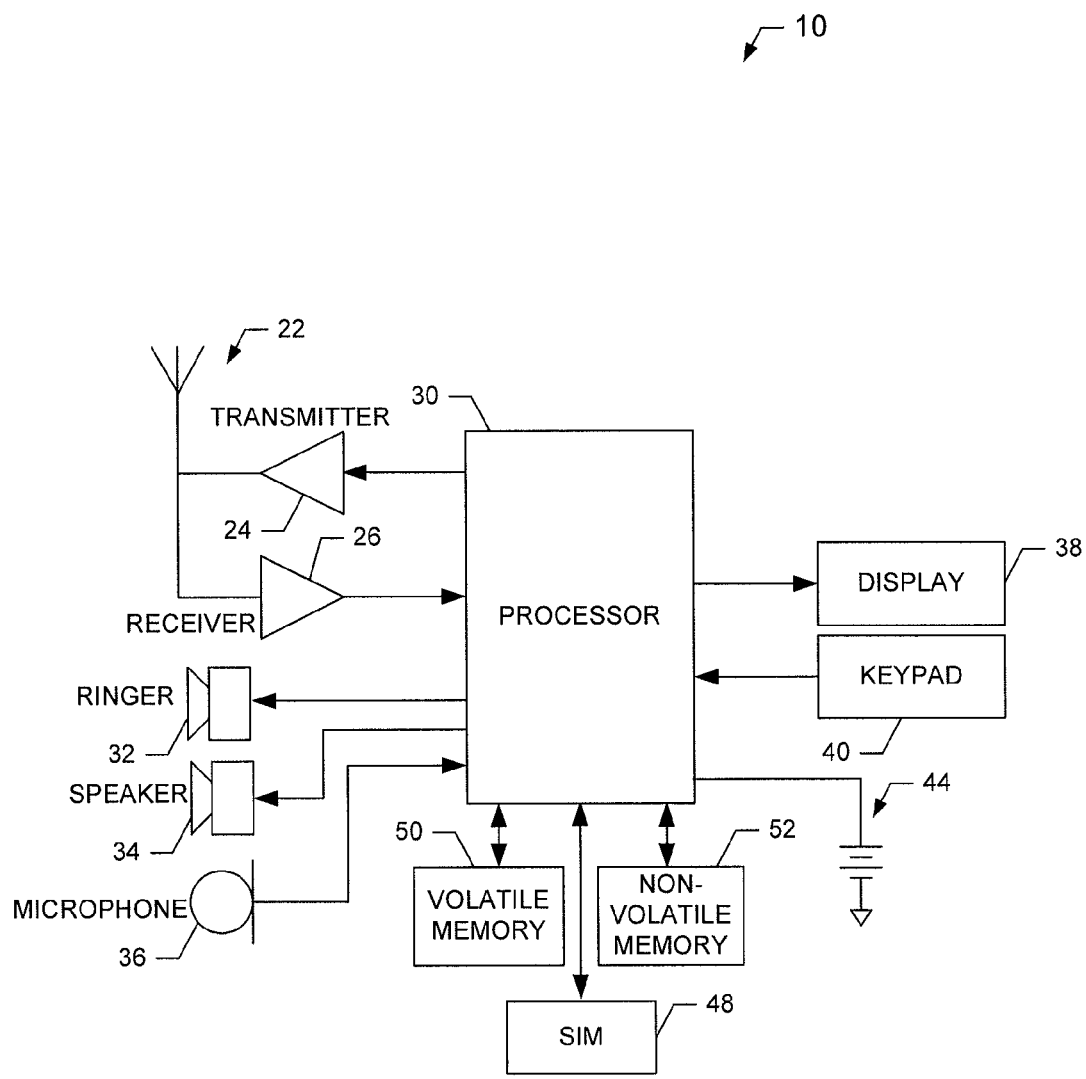
FIG. 2 is a block diagram of a mobile device, according to one embodiment of the present invention.

Although the mobile device 10 may be configured in various manners, one example of a mobile device that could benefit from embodiments of the invention is depicted in the block diagram of FIG. 2. While one embodiment of a mobile device will be illustrated and hereinafter described for purposes of example, other types of mobile devices, such as portable digital assistants (PDAs), pagers, mobile televisions, gaming devices, all types of computers (e.g., laptops or mobile computers), cameras, audio/video players, radios, or any combination of the aforementioned, and other types of mobile devices, may employ embodiments of the present invention. As described, the mobile device may include various means for performing one or more functions in accordance with embodiments of the present invention, including those more particularly shown and described herein. It should be understood, however, that a mobile device may include alternative means for performing one or more like functions, without departing from the spirit and scope of the present invention.

The mobile device 10 of the illustrated embodiment includes an antenna 22 (or multiple antennas) in operable communication with a transmitter 24 and a receiver 26. The mobile device may further include an apparatus, such as a processor 30, that provides signals to and receives signals from the transmitter and receiver, respectively. The signals may include signaling information in accordance with the air interface standard of the applicable cellular system, and/or may also include data corresponding to user speech, received data and/or user generated data. In this regard, the mobile device may be capable of operating with one or more air interface standards, communication protocols, modulation types, and access types. By way of illustration, the mobile device may be capable of operating in accordance with any of a number of first, second, third and/or fourth-generation communication protocols or the like. For example, the mobile device may be capable of operating in accordance with second-generation (2G) wireless communication protocols IS-136, global system for mobile communications (GSM) and IS-95, or with third-generation (3G) wireless communication protocols, such as universal mobile telecommunications system (UMTS), code division multiple access 2000 (CDMA2000), wideband CDMA (WCDMA) and time division-synchronous code division multiple access (TD-SCDMA), with 3.9G wireless communication protocol such as E-UTRAN (evolved-UMTS terrestrial radio access network), with fourth-generation (4G) wireless communication protocols or the like.

It is understood that the apparatus, such as the processor 30, may include circuitry implementing, among others, audio and logic functions of the mobile device 10. The processor may be embodied in a number of different ways. For example, the processor may be embodied as various processing means such as a processing element, a coprocessor, a controller or various other processing devices including integrated circuits such as, for example, an ASIC (application specific integrated circuit), an FPGA (field programmable gate array), a hardware accelerator, and/or the like. In an example embodiment, the processor is configured to execute instructions stored in a memory device or otherwise accessible to the processor. As such, whether configured by hardware or software methods, or by a combination thereof, the processor 30 may represent an entity capable of performing operations according to embodiments of the present invention, including those depicted in FIG. 4, while specifically configured accordingly. The processor may also include the functionality to convolutionally encode and interleave message and data prior to modulation and transmission.

The mobile device 10 may also comprise a user interface including an output device such as an earphone or speaker 34, a ringer 32, a microphone 36, a display 38, and a user input interface, which may be coupled to the processor 30. The user input interface, which allows the mobile device to receive data, may include any of a number of devices allowing the mobile device to receive data, such as a keypad 40, a touch display (not shown) or other input device. In embodiments including the keypad, the keypad may include numeric (0-9) and related keys (#, *), and other hard and soft keys used for operating the mobile device. Alternatively, the keypad may include a conventional QWERTY keypad arrangement. The keypad may also include various soft keys with associated functions. In addition, or alternatively, the mobile device may include an interface device such as a joystick or other user input interface. The mobile device may further include a battery 44, such as a vibrating battery pack, for powering various circuits that are used to operate the mobile device, as well as optionally providing mechanical vibration as a detectable output.

The mobile device 10 may further include a user identity module (UIM) 48, which may generically be referred to as a smart card. The UIM may be a memory device having a processor built in. The UIM may include, for example, a subscriber identity module (SIM), a universal integrated circuit card (UICC), a universal subscriber identity module (USIM), a removable user identity module (R-UIM), or any other smart card. The UIM may store information elements related to a mobile subscriber. In addition to the UIM, the mobile device may be equipped with memory. For example, the mobile device may include volatile memory 50, such as volatile Random Access Memory (RAM) including a cache area for the temporary storage of data. The mobile device may also include other non-volatile memory 52, which may be embedded and/or may be removable. The non-volatile memory may additionally or alternatively comprise an electrically erasable programmable read only memory (EEPROM), flash memory or the like. The memories may store any of a number of pieces of information, and data, used by the mobile device to implement the functions of the mobile device. For example, the memories may include an identifier, such as an international mobile equipment identification (IMEI) code, capable of uniquely identifying the mobile device.

Figure 3:
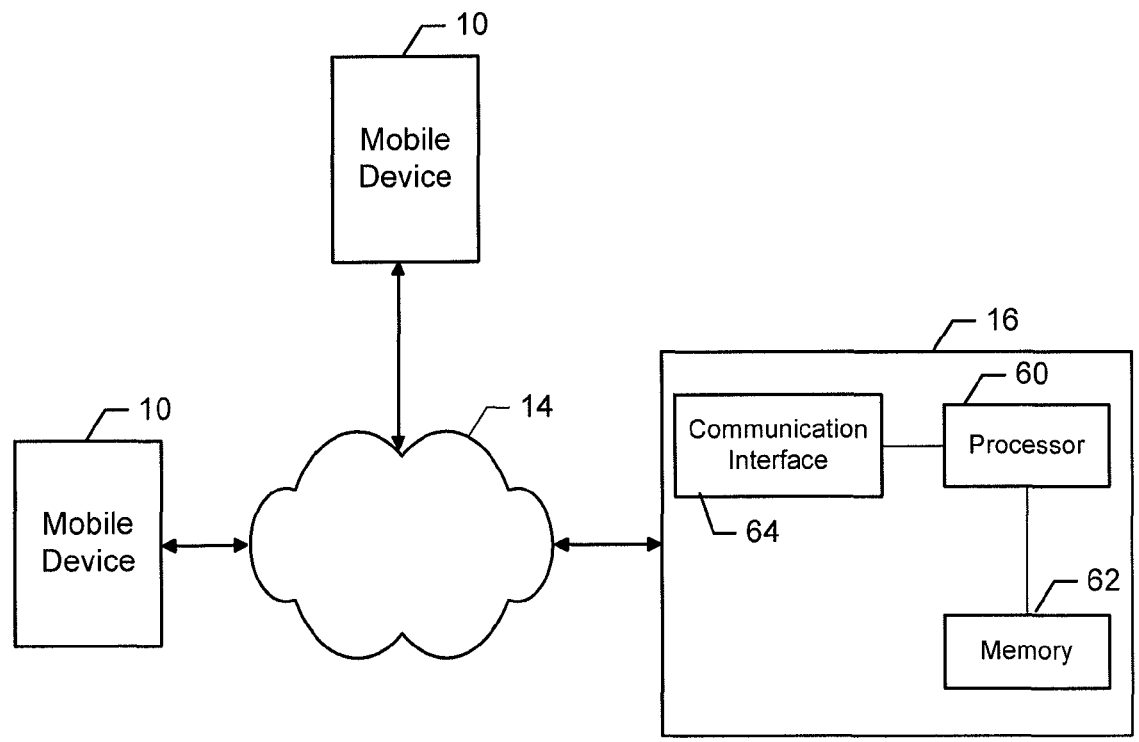
FIG. 3 is a schematic representation of a system for supporting embodiments of the present invention.

The mobile device 10 may be configured to communicate via a network 14 with a network entity 16, such as a server as shown in FIG. 3, for example. The network may be any type of wired and/or wireless network that is configured to support communications between various mobile devices and various network entities. For example, the network may include a collection of various different nodes, devices or functions such as the server, and may be in communication with each other via corresponding wired and/or wireless interfaces. Although not necessary, in some embodiments the network may be capable of supporting communications in accordance with any one of a number of first-generation (1G), second-generation (2G), 2.5G, third-generation (3G), 3.5G, 3.9G, fourth-generation (4G) level communication protocols, long-term evolution (LTE) and/or the like.

As described below, the server 16 may include or be associated with a database that may be accessible by a plurality of mobile devices 10 via the network 14. This database may maintain a plurality of predefined wireless signatures, such as previously observed wireless signatures (as used by way of example herein), in association with their respective, predefined geographical locations. Based upon an analysis of at least a subset of the information within the database, a mobile device may identify its current location by matching the current wireless signature with a previously observed wireless signature that is associated with a predefined geographical location. In one embodiment, the database is commonly accessible by a plurality of mobile devices. In another embodiment, the database is semi-private with the database only being accessible by a subset of mobile devices, such as the mobile devices of employees of a particular corporation, but not other mobile devices. In yet another embodiment, the database may be private with a mobile device only being able to access the wireless signatures that have been contributed by the respective mobile device. As shown in FIG. 3, a block diagram of a network entity 16 capable of operating as a server or the like is illustrated in accordance with one embodiment of the present invention. The network entity may include various means for performing one or more functions in accordance with embodiments of the present invention, including those more particularly shown and described herein. It should be understood, however, that the network entity may include alternative means for performing one or more like functions, without departing from the spirit and scope of the present invention.

In the illustrated embodiment, the network entity 16 includes means, such as a processor 60, for performing or controlling its various functions. The processor may be embodied in a number of different ways. For example, the processor may be embodied as various processing means such as a processing element, a coprocessor, a controller or various other processing devices including integrated circuits such as, for example, an ASIC, an FPGA, a hardware accelerator, and/or the like. In an example embodiment, the processor is configured to execute instructions stored in memory or otherwise accessible to the processor. As such, whether configured by hardware or software methods, or by a combination thereof, the processor 70 may represent an entity capable of performing operations according to embodiments of the present invention while specifically configured accordingly.

In one embodiment, the processor 60 is in communication with or includes memory 62, such as volatile and/or non-volatile memory that stores content, data or the like. For example, the memory may store content transmitted from, and/or received by, the network entity. Also for example, the memory may store software applications, instructions or the like for the processor to perform steps associated with operation of the network entity 16 in accordance with embodiments of the present invention. In particular, the memory may store software applications, instructions or the like for the processor to perform the operations described above and below with regard to FIG. 4. In one embodiment, the memory stores the database of previously observed wireless signatures in association with their respective, predefined geographical locations.

In addition to the memory 62, the processor 60 may also be connected to at least one interface or other means for transmitting and/or receiving data, content or the like. In this regard, the interface(s) can include at least one communication interface 64 or other means for transmitting and/or receiving data, content or the like, such as between the network entity 16 and the mobile device 10 and/or between the network entity and the remainder of network 12.

Figure 4:
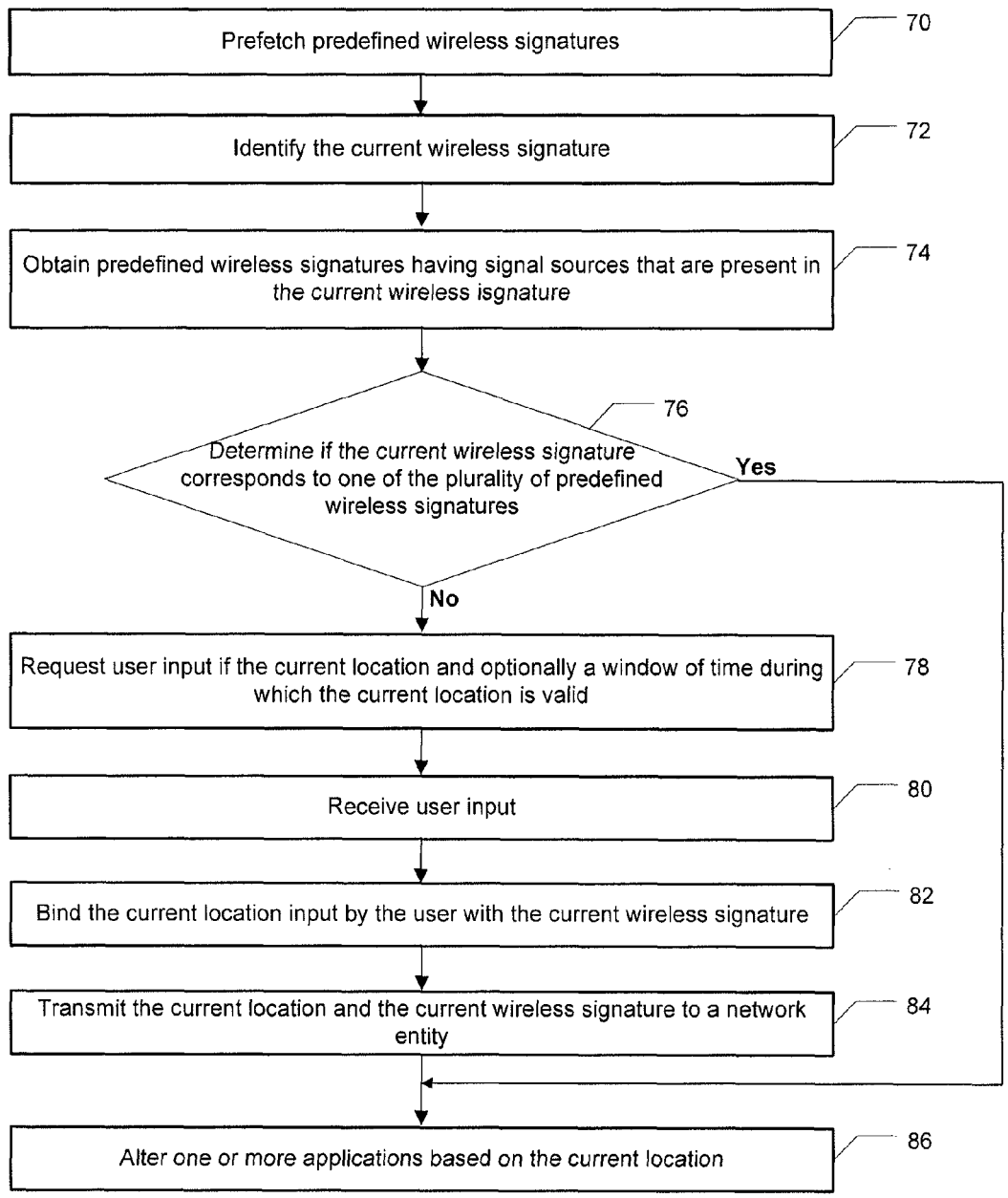
FIG. 4 is a flow chart of the operations performed in accordance with one embodiment of the present invention.

In order to determine its location in accordance with the embodiment depicted in FIG. 4, a mobile device 10 may identify the wireless signal present at its current geographical location. See operation 72. In order to identify the wireless signature, the mobile device may scan for wireless signals, such as the wireless signals having a predetermined frequency or within a predetermined range of frequencies. In one embodiment, for example, the processor 30 directs the receiver 26 to capture incoming wireless signals with the receiver itself being configured to receive signals having a predefined frequency or within a range of predefined frequencies. In one embodiment in which the access points 12 of a wireless local area network have deployed throughout a building such that the wireless signature will be comprised of the wireless signals emitted by the access points, the mobile device may be configured to detect the wireless signals incident at the mobile device at the operational frequency of the access points. Alternatively, in embodiments in which other types of sources are employed that emit wireless signals at other frequencies, the mobile device may be similarly configured to detect wireless signals at the other frequencies of interest.

The wireless signature that is identified by the mobile device 10 may include the received signal strength or other signal parameter for the wireless signals received from each access point in association with the address, such as the media access control (MAC) address, of each access point. With reference to the embodiment of FIG. 5, for example, four signal sources 12, such as four access points, are positioned throughout a portion of a building. Each access point of this embodiment has a unique address, such as 0xa3b, 0x6d2, 0xdc4, and 0x5fe.

Figure 5:
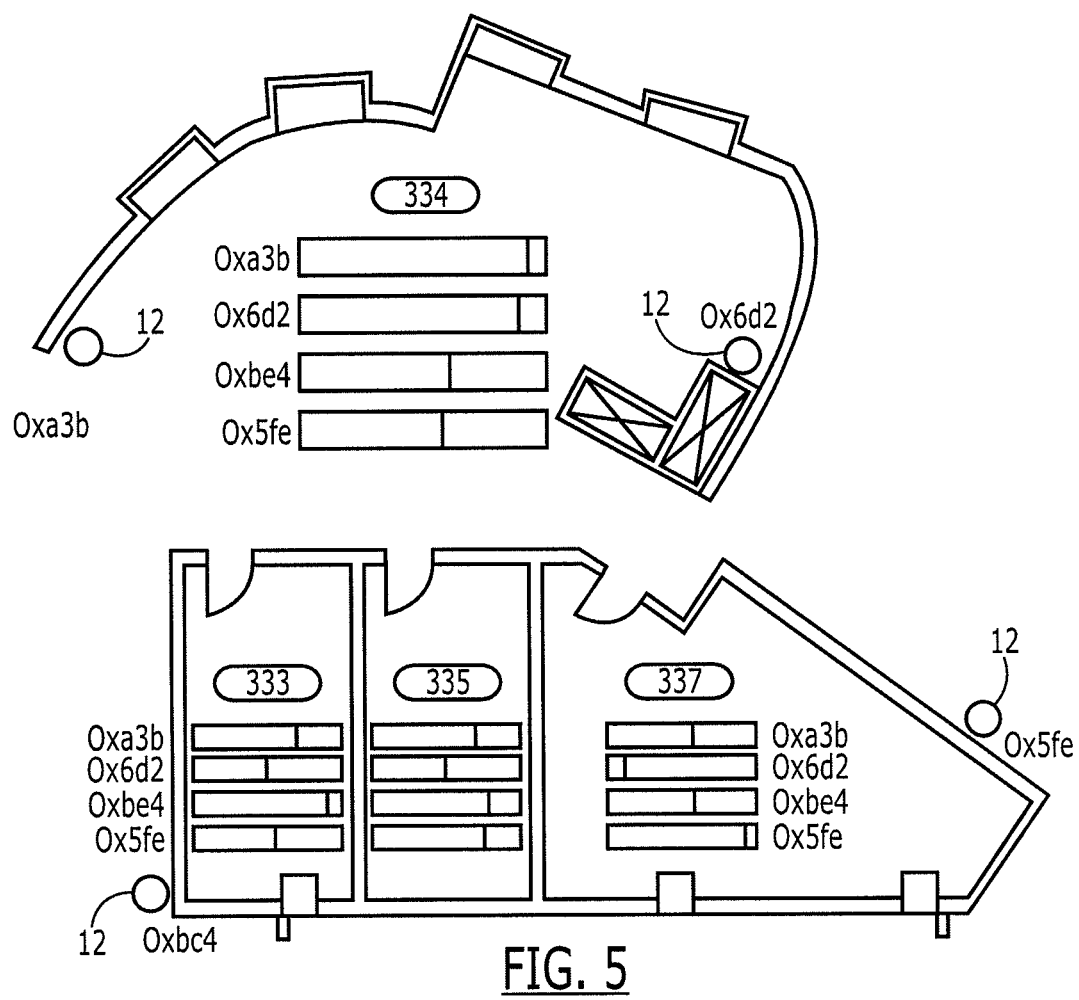
FIG. 5 is a schematic representation of the wireless signatures in each of four different spaces.

Because each room or space is differently situated with respect to the signal sources 12, both in terms of distance and in terms of intervening structures, such as walls, doors, windows and the like, the wireless signature received by a mobile device 10 within each space is generally different as shown, for example, in FIG. 5. By associating a particular wireless signature with a specific space, the space in which a mobile device is currently located may be identified by matching the current wireless signature received by the mobile device with the particular wireless signature associated with the space.

As such, after identifying the wireless signature present at a particular geographical location, the mobile device 10 and, more specifically, the processor 30 of one embodiment determines whether the current wireless signature corresponds to a previously observed wireless signature associated with a predefined geographical location and, if so, determines the predefined geographical location to be the current location. See operation 76 of FIG. 4. As such, the current wireless signature identified by the mobile device may be compared to a plurality of previously observed wireless signatures, such as maintained in a database, to determine if the requisite correspondence exists. Although the mobile device could transmit a representation of the current wireless signature to a network entity 16 with a request that the server determine whether the current wireless signature corresponds to any previously observed wireless signature stored in a database maintained or otherwise accessible by the network entity, this reliance upon the network entity could undesirably introduce latency. As such, the mobile device, in one embodiment, stores a number of previously observed wireless signatures in association with respective predefined geographical locations in local memory, such as volatile memory 50.

The mobile device 10 may obtain the plurality of previously observed wireless signatures in a variety of manners. In one embodiment, a network entity 16 maintains a database, such as in memory 62, of previously observed wireless signatures for respective predefined geographical locations for use by a plurality of mobile devices. As such, the mobile device may communicate with the network entity to obtain a potentially relevant subset of the data from the database pairing previously observed wireless signatures to respective predefined geographical locations. The potentially relevant subset of data may be defined in various manners. In one embodiment, in instances in which the processor 30 determines that the previously observed wireless signatures that are locally stored by the mobile device fail to include any previously observed signature that incorporates one or more of the signal sources that are present in the current wireless signature, the mobile device provides a network entity with the address of each signal source that is present in the current wireless signature. The network entity may then identify each previously observed wireless signature stored in the associated database that includes any of the signal sources present in the current wireless signature and may then provide each of these previously observed wireless signatures and the associated predefined geographical locations to the mobile device. See operation 74 of FIG. 4. In order to avoid latency introduced by the retrieval of data from the network entity once the current wireless signature has been identified, the mobile device may optionally pre-fetch the data as shown in operation 70 of FIG. 4. In this embodiment, the mobile device provides the network entity with an estimate of its current location, such as the most recent location at which the mobile device was determined to be. The network entity of this embodiment then identifies and provides to the mobile device all of the wireless signatures that are associated with respective predefined geographical locations that are within a predefined distance of the estimate of the mobile device's current location.

The mobile device 10 and, in particular, the processor 30 of the mobile device may then determine whether the current wireless signature corresponds to any one of the previously observed wireless signatures. See operation 76. In one embodiment, the processor determines whether the current wireless signature matches a previously observed wireless signature and, if so, determines a confidence level associated with a potential match with the current wireless signature only being considered to correspond to a previously observed wireless signature if the confidence level associated with the potential match satisfies a predefined threshold. With respect to the determination of whether the current wireless signature corresponds to a previously observed wireless signature, such as by matching a previously observed wireless signature and having an appropriate confidence level, the processor may employ any of a variety of conventional techniques including those described by Andreas Haeberlen, et al. in an article entitled *Practical Robust Localization Over Large-Scale 802.11 Wireless Networks*, MobiCom '04, Sep. 26-Oct. 1, 2004, Philadelphia, Pa., USA, including, for example, Markov localization.

In one embodiment, the processor 30 utilizes negative information in conjunction with the determination as to whether the current wireless signature corresponds to any one of the previously observed wireless signatures. For example, if the previously observed wireless signature for space A includes signals from signal sources 1, 2 and 3 and the previously observed wireless signature for space B includes signals from signal sources 1 and 2, with the signals from signal sources 1 and 2 being the same within spaces A and B, the processor may use the absence of signals from signal source 3 (e.g., negative information) in the current wireless signature to determine that the current wireless signature corresponds to the previously observed wireless signature for space B. As such, negative information regarding which signal source(s) cannot be seen in a particular space may assist in the determination of the current location, such as by "breaking ties" with other spaces in which the signal source(s) may be seen and which otherwise have a comparable or the same signature for the other signal sources.

In this embodiment, if the processor identifies one of the previously observed wireless signatures to correspond to the current wireless signature, the predefined geographical location associated with the previously observed wireless signature that matches the current wireless signature is determined by the processor to be the current location of the mobile device. Additionally, the mobile device and, in particular, the processor may modify the configuration and/or execution of one or more applications to take into account the current location of the mobile device. See operation 86.

Each previously observed wireless signature may have an associated expiration time. For example, the signal sources may change over time as new signal sources are added, as existing signal sources are removed or simply moved and/or as the intervening structures are changed. As such, the previously observed wireless signature and its association with a predefined geographical location will only be valid in one embodiment so long as the previously observed wireless signature has not expired, such as reflected by the current time not exceeding the expiration time associated with the previously observed wireless signature. As such, in instances in which the mobile device 10 is determining if any previously observed wireless signature stored in the local memory corresponds to the current wireless signature, any previously observed wireless signature that has expired may be removed from consideration. Additionally, the network entity 16 may consider the expiration times associated with the various previously observed wireless signatures prior to transmitting the previously observed wireless signatures and the associated predefined geographical locations to a mobile device with any previously observed wireless signatures that have expired being removed and not being transmitted.

In addition to attempting to determine the current location based upon a comparison of the current wireless signature to a plurality of previously observed wireless signatures as described above, the method, apparatus and computer program product of embodiments of the present invention also request user input of the current location of the mobile device 10 in various instances in order not only to define the current location, but also to populate the database by associating the current wireless signature detected by the mobile device with the current location provided by a user of the mobile device. The mobile device may solicit input from the user regarding the current location in various manners. For example, the mobile device and, more specifically, the processor 30 of one embodiment prompts the user, such as by means of a question presented via the display 38, to provide the current location of the mobile device in response (and, in one embodiment, only in response) to the failure of the processor to identify any previously observed wireless signature that corresponds to the current wireless signature, such as by failing to identify any previously observed wireless signature that matches the current wireless signature with a sufficient confidence level. See operation 78. In instances in which the user responds to the prompt by providing an indication of the current location of a mobile device, the mobile device may also identify the current wireless signature such that the current wireless signature may be paired or bound to the current location provided by the user, along with a current timestamp. See operations 80 and 82 of FIG. 4. This pairing of the current location and the current wireless signature may then be transmitted from the mobile device via the network 14 to the network entity 16 for inclusion in the database, thereby serving to further populate the database for the potential benefit of a number of users. See operation 84. As noted above, the mobile device and, in particular, the processor may also modify the configuration and/or execution of one or more applications to take into account the current location of the mobile device. See operation 86.

The mobile device 10 may additionally or alternatively solicit input from the user regarding the current location in other manners or in other situations. For example, the mobile device and, more specifically, the processor 30 of one embodiment prompts the user, such as by means of a question presented via the display 38, to provide the current location of the mobile device at a predefined time interval, such as every five minutes, every fifteen minutes, every thirty minutes, or the like. In instances in which the user responds to the prompt by providing an indication of the current location of a mobile device, the mobile device may also identify the current wireless signature such that the current wireless signature may be paired or bound to the current location provided by the user. This pairing of the current location and the current wireless signature along with the current timestamp may then be transmitted from the mobile device via the network 14 to a network entity 16 for inclusion in the database, as described above. If desired, the user may indicate to the processor (such as by selecting a "sleep" icon) that the periodic prompts should be discontinued, at least for awhile.

In instances in which the user provides the current location, the mobile device 10 may not only provide the network entity 16 with the current location, as provided by the user, and the current wireless signature for inclusion in the database maintained by the network entity, but the mobile device may also provide any predefined geographical location associated with a previously observed wireless signature that was independently found to correspond to the current wireless signature. For example, in instances in which the mobile device prompts the user to provide the current location at predefined time intervals, the mobile device may provide the network entity not only with the pairing of the current wireless signature and the current location that is provided by the user, but also the predefined geographical location that is associated with a previously observed wireless signature that is found to correspond to the current wireless signature in the manner described above in conjunction with operations 82 and 84 of FIG. 4. As such, the network entity (or the mobile device in some embodiments) may compare the current location provided by the user with the predefined geographical location that has been identified independently to determine the accuracy of the technique by which the current location of the mobile device is determined and to provide information that may be useful in troubleshooting instances in which the location determination is not as accurate as desired.

Figure 6:
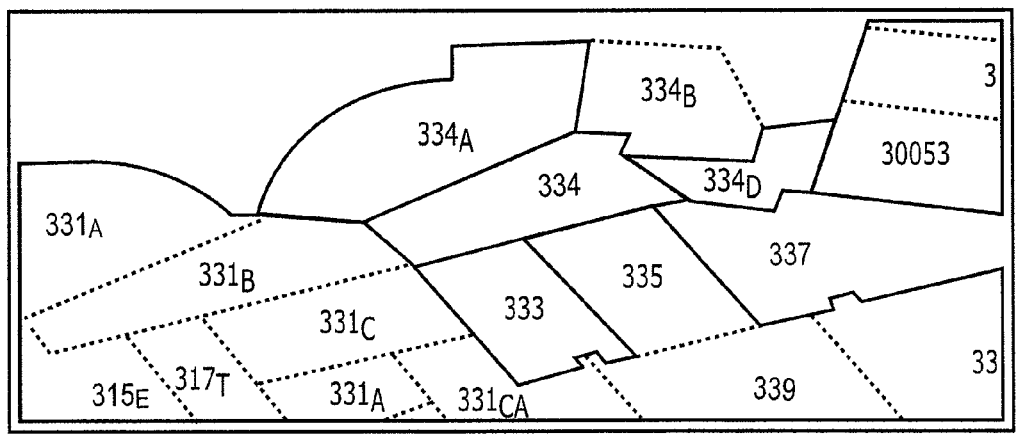
FIG. 6 is a display of a floor plan of a portion of a building that facilitates the identification of the current geographical location in accordance with embodiments of the present invention.

As described above, the mobile device 10 may query the user, such as via a question posed via the display 38, regarding the current location. While the mobile device may be configured to receive user input of the current location in various manners including free text entry of the name of the room, the room number or the like, the mobile device of one embodiment presents an image of a floor plan of the building via the display and permits the user to select one of the rooms from the floor plan as the room in which the mobile device is currently located. As such, images of the floor plan may be stored in memory, such as volatile memory 50, and may be accessible by the processor 30 for presentation upon the display in conjunction with a request for the user to enter their current location. In instances in which the processor has an estimated location, such as based upon the signal sources present in the current wireless signature and/or based upon a recent location of the mobile device, the processor may display only a portion of the floor plan that includes and surrounds the estimated location. In this embodiment, however, the user may scroll to other portions of the floor plan or jump to the floor plan of other floors, if so desired. Although the processor may simply direct that the floor plan or a portion of the floor plan to be displayed, the processor of one embodiment as shown in FIG. 6 also highlights or otherwise identifies the space selected by the user as a current location (room 333), the space that was independently determined to be the current location (Room 334.sub.A) based upon a comparison with the previously observed wireless signatures and/or those spaces for which data exists or has been downloaded to the mobile device.

Figure 7:
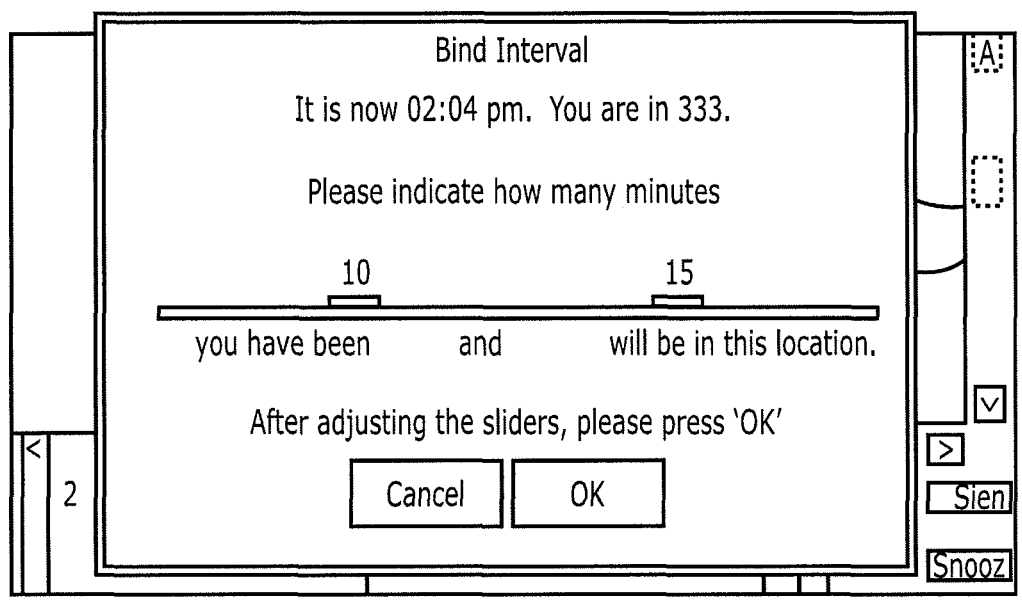
FIG. 7 is a display that permits the definition of a time interval during which the current geographical location will be valid in accordance with embodiments of the present invention.

In addition to requesting the user to provide the current location, the mobile device 10 and, more specifically, the processor 30 may solicit information from the user, such as by posing a query upon the display 38, as to how long the user has been and/or will be at the current location. See operation 78 of FIG. 4. While this information may be provided in various manners, FIG. 7 depicts one exemplary display having two sliders that are movable by a user to define the opposite ends of a window of time in which the mobile device has been and/or will be in the current location. In other embodiments, the processor only solicits information that is either rearwardly looking in that it requests information from the user as to how long the user has been in the current location or forwardly looking in that it requests information from the user as to how long the user anticipates to be at the current location. By receiving input from the user defining the window of time within which the user has been and/or will be at the current location, the processor may associate each of the wireless signatures that are identified within the same window of time as being associated with the current location. Each of these wireless signatures and the current location may be provided to the network entity 16 for further population of the database, thereby increasing the reliability and robustness of the database.

In the foregoing example, it may be useful to capture and record multiple wireless signatures within the window of time even though the mobile device 10 does not change position since the wireless signature that is identified at a particular location may change, at least slightly, over time. For example, the wireless signature produced by the same signal sources within the same space may change based upon the temperature, the number of personnel in the space and/or other factors. As such, the identification of a plurality of wireless signatures for association with the same location may further enrich the database.

Additionally, the manner in which a wireless signature represents the signal strength associated with each signal source may take into account the potential of a wireless signature to vary somewhat based upon various parameters. In this regard, although the signal strength of the signals transmitted by each signal source visible within a space may be represented in various manners, the signal strength is represented in one embodiment by its received signal strength indication (RSSI), although other measures may be alternatively employed, such as signal to noise ratio (SNR). The RSSI values may be normalized or scaled so as to lie within a predefined range, such as 0 to 100. For each space and for each signal source visible within the space, the processor 30 of one embodiment constructs a histogram of the number (i.e., count) of signals received within the space from the respective signal source having respective RSSIs. In this embodiment and in recognition of the potential of the wireless signature to vary somewhat over time, the reception of a signal having a particular RSSI will be reflected not only in the count associated with the particular RSSI, but also in the counts of the RSSIs proximate to the particular RSSI. For example, instead of merely incrementing the count associated with a RSSI of six in response to detecting a signal within the space from the respective signal source having a RSSI of 6, the count associated with an RSSI of 6 may be increased by a predefined amount, such as 0.8, the counts associated with the immediately-adjacent RSSIs, such as RSSIs of 5 and 7, may be incremented by smaller predefined amounts, such as 0.075, and the counts associated with the RSSIs that are two removed from the particular RSSI, such as RSSIs of 4 and 8, may be incremented by an even smaller predefined amount, such as 0.025. By doing so, the histogram may be more smoothly contoured.

As described above, FIG. 4 is a flowchart of an apparatus, method and program product according to some exemplary embodiments of the invention. It will be understood that each block or step of the flowcharts, and combinations of blocks in the flowcharts, can be implemented by various means, such as hardware, firmware, and/or software including one or more computer program instructions. For example, one or more of the procedures described above may be embodied by computer program instructions. In this regard, the computer program instructions which embody the procedures described above may be stored by a memory device of a mobile device 10, network entity such as a server 16 or other apparatus employing embodiments of the present invention and executed by a processor 30, 60 in the mobile device, server or other apparatus. In this regard, the operations described above in conjunction with the diagram of FIG. 4 may have been described as being performed by the communications device and a network entity such as a server, but any or all of the operations may actually be performed by the respective processors of these entities, for example in response to computer program instructions executed by the respective processors. As will be appreciated, any such computer program instructions may be loaded onto a computer or other programmable apparatus (i.e., hardware) to produce a machine, such that the instructions which execute on the computer (e.g., via a processor) or other programmable apparatus create means for implementing the functions specified in the flowcharts block(s) or step(s). These computer program instructions may also be stored in a computer-readable memory that can direct a computer (e.g., the processor or another computing device) or other programmable apparatus to function in a particular manner, such that the instructions stored in the computer-readable memory produce an article of manufacture including instruction means which implement the function specified in the flowcharts block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowcharts block(s) or step(s).

Accordingly, blocks or steps of the flowcharts support combinations of means for performing the specified functions, combinations of steps for performing the specified functions and program instruction means for performing the specified functions. It will also be understood that one or more blocks or steps of the flowcharts, and combinations of blocks or steps in the flowcharts, can be implemented by special purpose hardware-based computer systems which perform the specified functions or steps, or combinations of special purpose hardware and computer instructions.

In an exemplary embodiment, an apparatus for performing the method of FIG. 4 may include a processor (e.g., the processor(s) 30 and/or 60) configured to perform some or each of the operations (70-86) described above. The processor(s) may, for example, be configured to perform the operations (70-86) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 70-86 may comprise, for example, the processor(s) 30 and/or 60 as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. For example, although the mobile device 10 has been described as determining whether the wireless signature corresponds to a previously observed wireless signature, requesting and receiving an identification of the geographical location and associating the wireless signature with the identification of the geographical location, a network entity 16, such as the server, may perform some or all of these operations and may then provide the current location to the mobile device for use, for example, in appropriately configuring and/or executing various applications. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
  identifying a wireless signature present and receivable at a geographical location, the wireless signature present and receivable at the geographical location including one or more parameters for wireless signals receivable at the geographical location;
  determining whether the wireless signature present and receivable at the geographical location corresponds to a previously observed wireless signature stored associated with a predefined geographical location;
  receiving an identification of the geographical location when the wireless signature fails to correspond to a previously observed wireless signature stored associated with a predefined geographical location, wherein receiving an identification includes receiving an input from a mobile device at the geographical location; and
  associating, with a processor, the wireless signature with the identification of the geographical location,
  wherein the wireless signature present and receivable at the geographical location includes a signal from each of at least two or more signal sources, the media access control (MAC) addresses of said each of the at least two or more signal sources, and the signal strength corresponding to the MAC address of said each of the at least two or more signal sources.

2. A method according to claim 1 further comprising requesting the identification of the geographical location when the wireless signature fails to correspond to any previously observed wireless signature associated with a predefined geographical location, and wherein receiving the identification of the geographical location is responsive to requesting the identification of the geographical location.

3. A method according to claim 1 further comprising requesting the identification of the geographical location at predefined time intervals, and wherein receiving the identification of the geographical location is responsive to requesting the identification of the geographical location.

4. A method according to claim 1 wherein receiving the identification of the geographical location comprises receiving a definition of a time interval during which the identification of the geographical location is valid.

5. A method according to claim 1 further comprising updating a local memory when the wireless signature identifies a wireless signal source that is different than the wireless signal sources identified by the previously observed wireless signatures stored by the local memory.

6. A method according to claim 1 further comprising updating a local memory with one or more previously observed wireless signatures associated with respective predefined geographical locations within a predetermined distance of an estimated location.

7. A method according to claim 1 further comprising providing an association of the wireless signature with the identification of the geographical location to a database accessible by at least one mobile device.

8. A method according to claim 7 further comprising also providing any predefined geographical location associated with a previously observed wireless signature that corresponds to the wireless signature.

9. A method according to claim 1 wherein determining whether the wireless signature corresponds to a previously observed wireless signature comprises determining whether the wireless signature matches a previously observed wireless signature associated with a predefined geographical location.

10. A method according to claim 9 wherein determining whether the wireless signature matches a previously observed wireless signature comprises determining whether a confidence level associated with a potential match satisfies a predefined threshold.

11. A method according to claim 9 wherein each previously observed wireless signature has a respective expiration date, and wherein determining whether the wireless signature matches a previously observed wireless signature comprises determining whether the wireless signature matches a previously observed wireless signature that remains valid relative to the respective expiration date.

12. An apparatus comprising a processor configured to:
  identify a wireless signature present and receivable at a geographical location, the wireless signature present and receivable at the geographical location including one or more parameters for wireless signals receivable at the geographical location;
  determine whether the wireless signature present and receivable at the geographical location corresponds to a previously observed wireless signature stored associated with a predefined geographical location;
  receive an identification of the geographical location when the wireless signature fails to correspond to a previously observed wireless signature stored associated with a predefined geographical location, wherein receive an identification includes receive an input from a mobile device at the geographical location; and
  associate the wireless signature with the identification of the geographical location,
  wherein the wireless signature present and receivable at the geographical location includes a signal from each of at least two or more signal sources, the media access control (MAC) addresses of said each of the at least two or more signal sources, and the signal strength corresponding to the MAC address of said each of the at least two or more signal sources.

13. An apparatus according to claim 12 wherein the processor is further configured to request the identification of the geographical location when the wireless signature fails to correspond to any previously observed wireless signature associated with a predefined geographical location, and wherein the processor is configured to receive the identification of the geographical location in response to requesting the identification of the geographical location.

14. An apparatus according to claim 12 wherein the processor is further configured to request the identification of the geographical location at predefined time intervals, and wherein the processor is further configured to receive the identification of the geographical location in response to requesting the identification of the geographical location.

15. An apparatus according to claim 12 wherein the processor is configured to receive the identification of the geographical location in conjunction with a definition of a time interval during which the identification of the geographical location is valid.

16. An apparatus according to claim 12 further comprising a local memory configured to store one or more previously observed wireless signatures associated with respective predefined geographical locations, wherein the processor is further configured to update the local memory when the wireless signature identifies a wireless signal source that is different than the wireless signal sources identified by the previously observed wireless signatures stored by the local memory.

17. An apparatus according to claim 12 further comprising a local memory configured to store one or more previously observed wireless signatures associated with respective predefined geographical locations, wherein the processor is further configured to updating the local memory with one or more previously observed wireless signatures associated with respective predefined geographical locations within a predetermined distance of an estimated location.

18. An apparatus according to claim 12 wherein the processor is also configured to provide an association of the wireless signature with the identification of the geographical location to a database accessible by at least one mobile device.

19. A computer program product comprising at least one non-transitory computer-readable storage medium having computer-executable program instructions stored therein, the computer-executable program instructions comprising:
   a program instruction configured to identify a wireless signature present and receivable at a geographical location, the wireless signature present and receivable at the geographical location including one or more parameters for wireless signals receivable at the geographical location;
   a program instruction configured to determine whether the wireless signature present and receivable at the geographical location corresponds to a previously observed wireless signature stored associated with a predefined geographical location;
   a program instruction configured to receive an identification of the geographical location when the wireless signature fails to correspond to a previously observed wireless signature stored associated with a predefined geographical location, wherein receive an identification includes receive an input from a mobile device at the geographical location; and
   a program instruction configured to associate the wireless signature with the identification of the geographical location,
   wherein the wireless signature present and receivable at the geographical location includes a signal from each of at least two or more signal sources, the media access control (MAC) addresses of said each of the at least two or more signal sources, and the signal strength corresponding to the MAC address of said each of the at least two or more signal sources.

20. A computer program product according to claim 19 further comprising a program instruction configured to request the identification of the geographical location when the wireless signature fails to correspond to any previously observed wireless signature associated with a predefined geographical location.

* * * * *